(12) United States Patent
Matsuo

(10) Patent No.: US 7,204,134 B2
(45) Date of Patent: Apr. 17, 2007

(54) ENGINE SUCTION AIR FLOW RATE MEASURING DEVICE

(76) Inventor: Noritaka Matsuo, 1-15-12 Asahigaoka, Kakegawa, Shizuoka, 436-0062 (JP)

( * ) Notice: Subject to any disclaimer, the term of this patent is extended or adjusted under 35 U.S.C. 154(b) by 0 days.

(21) Appl. No.: 10/547,317

(22) PCT Filed: Mar. 1, 2004

(86) PCT No.: PCT/JP2004/002512

§ 371 (c)(1),
(2), (4) Date: Sep. 1, 2005

(87) PCT Pub. No.: WO2004/079305

PCT Pub. Date: Sep. 16, 2004

(65) Prior Publication Data

US 2006/0173607 A1    Aug. 3, 2006

(30) Foreign Application Priority Data

Mar. 3, 2003    (JP) .............................. 2003-055856

(51) Int. Cl.
*G01M 15/00* (2006.01)

(52) U.S. Cl. .................................................... 73/118.2

(58) Field of Classification Search ............... 73/116, 73/117.2, 117.3, 118.1, 118.2; 701/29
See application file for complete search history.

(56) References Cited

U.S. PATENT DOCUMENTS

| | | | | |
|---|---|---|---|---|
| 5,654,501 A * | 8/1997 | Grizzle et al. | ............. | 73/118.2 |
| 6,598,469 B2 * | 7/2003 | Shimoyama et al. | ...... | 73/117.3 |
| 6,681,742 B1 * | 1/2004 | Hirayama et al. | .......... | 123/399 |
| 6,985,806 B2 * | 1/2006 | Stadler | ....................... | 701/102 |
| 7,003,390 B2 * | 2/2006 | Kaga | .......................... | 701/101 |
| 7,027,905 B1 * | 4/2006 | Mladenovic et al. | ........ | 701/102 |
| 2005/0021215 A1 * | 1/2005 | Stadler | ....................... | 701/102 |

* cited by examiner

*Primary Examiner*—Eric S. McCall

(57) ABSTRACT

The present invention embodies an engine intake air flow meter measuring a mass flow rate based on measured pressures in an intake pipe, such as a pressure difference between two points and a pressure at a point. Calculations for integration and double integration of the pressure difference are performed, and both values of integration and double integration are corrected at a moment when an air flow rate is detected to be a zero based on a value of a time derivative of the pressure. Then a mass flow rate and an amount of air are calculated by the value of integration and the value of double integration respectively.

2 Claims, 17 Drawing Sheets

Integration Module

ENGINE SUCTION AIR FLOW RATE MEASURING DEVICE

BACKGROUND OF THE INVENTION

Today, most of automobile engines employ a fuel injection system to control an air-fuel ratio accurately for improving exhaust emissions or fuel consumption. In a fuel injection engine, an amount of fuel to be injected is determined by an amount of mass of intake air and a desired air-fuel ratio. In particular, with a multi-cylinder engine, an air flow meter is required to have the ability of measuring an amount of intake air for each cylinder with high accuracy and response. Air flow meters in common use for a fuel injection engine today or in the past are such as a vane type flow meter, a hot-wire flow meter, or a Karman vortices flow meter.

A vane type flow meter is not being used today for production engines because of the disadvantages such that a vane causes a large amount of flow resistance, and an inertia of vane lowers response under transient states of engine running, though, from the viewpoint of principle, it has the advantage of capability of measuring a mass flow rate.

A hot-wire flow meter has the advantage of the ability of measuring a mass flow rate of pulsation flow with high response, while the disadvantages of requiring some additional devices for detecting a flow direction when adopted for measurement in a flow field where both of the order and reverse direction flows occur alternately, and causing a measurement error by stains on a hot-wire surface. FIG. 17 shows an example of a multi-cylinder engine with a multi-point injection system employing a hot-wire flow meter. In the figure, referring number 19 refers to a cylinder, 13 refers to an intake valve, 17 refers to an exhaust valve, 12 refers to an intake pipe, 28 refers to conjunct exhaust manifold, 14 refers to an air collector, 15 refers to a throttle valve, 27 refers to an fuel injector, and 42 refers to a hot-wire flow meter. Intake air is adapted to pass through throttle valve 15 to be accumulated in air collector 14 after metered by hot-wire flow meter 42, and flow into cylinder 19 through intake pipe 12. Preferably, hot-wire flow meter 42 is installed on intake pipe 12 of each cylinder to measure an amount of intake air for each cylinder with high response, however, intake pipe 12 provides a flow field with poor conditions for measuring with a hot-wire sensor such as solid particulate in a back flow gas from a cylinder or fuel particles injected by injector 27 are floating, and inflow and back flow occur alternately. Accordingly, in most engines, hot-wire flow meter 42 is installed on an upstream section of air collector 14 that is in communication with intake pipe 12, and hence it is difficult to measure an amount of intake air for each cylinder or varying of air flow rate accurately when an engine is running in a transient state.

A Karman vortices flow meter has the advantages of high response to flow pulsation and high resistance to deterioration in measurement accuracy by stains on a sensor. However, there are the problems such that an output variable of the flow meter is related to a volumetric flow rate that must be converted to a mass flow rate for air-fuel ratio control application, hence a temperature sensor and a pressure sensor must be employed in combination with a flow sensor, some devices for detecting a flow direction is needed as well as a hot-wire flow meter, and further a design of an intake pipe is restricted because a calibration characteristics of an output of a sensor against a flow rate strongly depend on the designs of a cone to generate Karman vortices and a passage around the cone. Therefore, it is difficult to measure an amount of intake air for each cylinder or varying of intake air flow accurately when an engine is running in a transient state as well as a hot-wire flow meter.

Differential pressure type flow meters such as an orifice flow meter or a laminar flow meter are used for measuring an intake air flow rate in engine bench tests. However, they are not applied to an engine onboard air flow meter because of their disadvantages of lowering engine performances to cause a large amount of flow resistance from the viewpoint of principle, and poor applicability for measurement of pulsation flows like an engine intake flow such as a calibration characteristic of the orifice flow meter being in proportion to the square with an air flow rate, and low response to flow pulsation of the laminar flow meter, though they have the advantages of low cost of pressure sensors and high resistance to deterioration in measurement accuracy by stains.

There is the preceding unexamined patent publication No. 10-111159 titled 'Source type mass flow meter' that relates to a differential pressure type flow meter for measuring a mass flow rate of pulsating flow, however it is structurally complicated and costly employing a source flow generator supplying pulsating source flow to main flow to be measured.

Summarizing the descriptions in [0001] through [0006], requirements to flow meter for measuring an engine intake air flow rate are as the following.
1. Capability of measuring a mass flow rate for air-fuel ratio control application
2. Capability of measuring a pulsation flow in both the order and reverse direction with high response
3. A feature that flow resistance is not increased by a flow meter itself
4. Resistance to deterioration in an measurement accuracy by stains attributed to dusts or particles in the atmosphere or an EGR gas.
5. Capability of measuring an amount of air for each cylinder of multi-cylinder engine, being installed on each intake pipe However, no flow meter mentioned above meets all these requirements.

BRIEF SUMMARY OF THE INVENTION

Accordingly, it is a primary object of the present invention to provide an engine intake air flow meter for measuring an amount of intake air for each cylinder without increasing of flow resistance and deterioration in measuring accuracy caused by stains on sensors, employing a means such as measuring a pressure difference between two points and a pressure at one point in an engine intake pipe, as calculating an mass flow rate of intake air based on the measured pressure.

BRIEF DESCRIPTION OF THE DRAWINGS

The present invention as defined in the claims can be better understood with reference to the following drawings, as follows:

DETAILED DESCRIPTION OF THE INVENTION

An intake air flow meter that the present invention provides is a mass flow meter using measured pressure data. In the following, an abbreviated character F means a mass flow rate of air, F' means a time derivative of flow rate F, and M means an amount of mass of air that is calculated by integration of flow rate F. The basic principle of the measurement employed is as follows.
1. Calculating time derivative of a flow rate F' at the middle of two points in an intake pipe from a pressure difference between the two points.
2. Calculating mass flow rate F from integration of time derivative of a flow rate F'.
3. Calculating amount of mass of air M from integration of mass flow rate F.
4. Detecting a moment when mass flow rate F is a zero based on a time derivative of a pressure at a random point in an intake pipe and performing corrections of mass flow rate F and amount of mass of air M at said moment.

Figure 13:
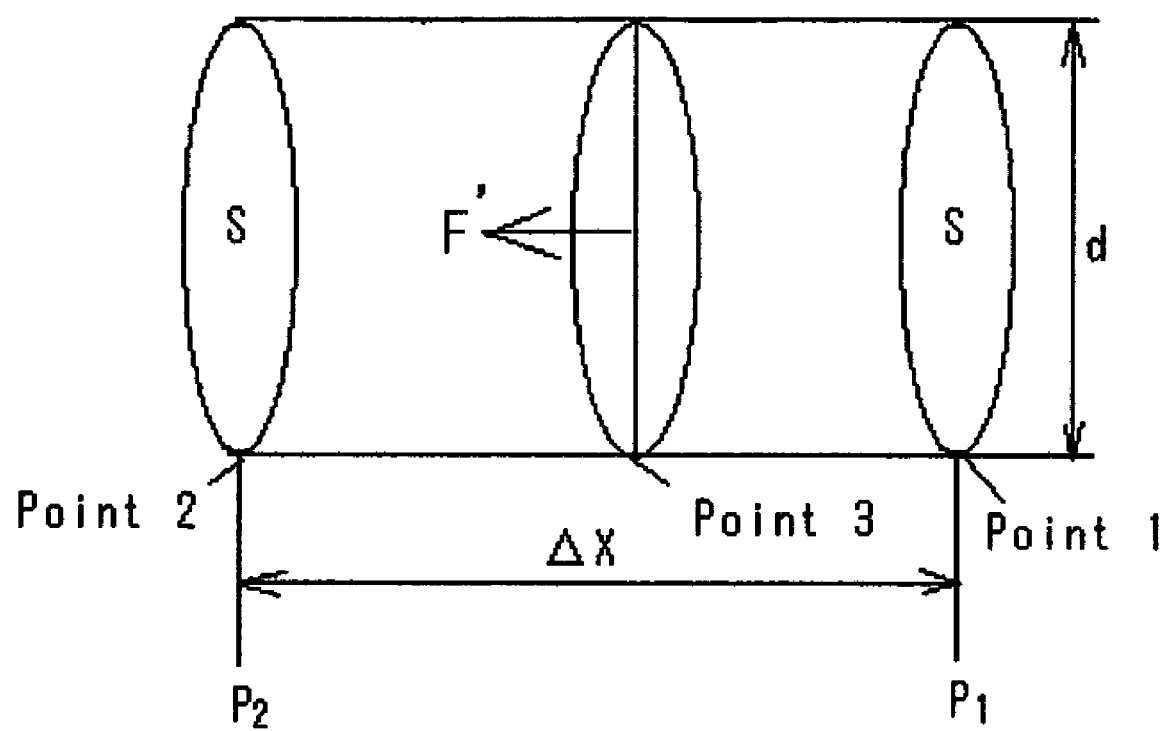
FIG. 13 is an illustration with reference to a principle of measuring a flow rate in a pipe of which cross-sectional area is a constant.

FIG. 13 shows the principle of calculating time derivative of flow rate F' from a differential pressure. In FIG. 13, if point 1 and point 2 are points spaced apart for a distance X in a longitudinal direction of a pipe with a constant cross-sectional area S, and a constant inner diameter d, and point 3 is the middle point of point 1 and point 2, it is well-known that time derivative of flow rate F' can be calculated by Equation 1.

$$F' = S \cdot \frac{\Delta P}{\Delta X} - \frac{\lambda}{2 \cdot S \cdot \rho \cdot d} \cdot F^2 \qquad \text{[Equation 1]}$$

where P1 and P2 are the pressures at point 1 and 2 respectively, $\Delta P$ is a differential pressure P1–P2, $\rho$ is air density, and $\lambda$ is a friction factor of the pipe.

For accurate measurement of a differential pressure, preferably $\Delta X$ is large because $\Delta P$ increases with $\Delta X$, however, $\Delta P/\Delta X$ that approximates a theoretical pressure gradient $\partial P/\partial X$ lowers its approximation accuracy with $\Delta X$.

For example, Equation 2 must hold so that F' in Equation 1 may obtain 99% or more accuracy compared with an analytic solution using $\partial P/\partial X$.

$$\Delta X < \frac{0.5 a}{\omega} \qquad \text{[Equation 2]}$$

where a is the acoustic velocity, and $\omega$ is an angular velocity of pressure pulsation. Furthermore, Equation 3 must hold when said $\omega$ represents an angular velocity of the first harmonic fraction in resonance of air column in a pipe of the length L.

$$\Delta X < \frac{L}{3} \qquad \text{[Equation 3]}$$

F' is almost in proportion to pressure gradient $\Delta P/\Delta X$, if a value of a viscous friction term which is the second term of the right side of Equation 1 is much smaller than a value of pressure gradient term, which is the first term of the right side of the equation. Actually, engine intake flow is fluctuating in a high frequency of several hundreds Hz, repeating rapid acceleration and deceleration alternately, therefore, the value of the viscous friction term can be ignored as it is estimated at approximately 1% or less of the value of the pressure gradient term on the time average, if pipe friction factor $\lambda$ is calculated from Blasius's equation, assuming that $\Delta X$ is equal to d. Therefore, Equation 4 can be used to calculate the approximate value of F'. In Equation 4, S and $\Delta X$ are geometrical variables, so F' can be calculated if $\Delta P$ is available.

$$F' = S \cdot \frac{\Delta P}{\Delta X} \qquad \text{[Equation 4]}$$

Figure 14:
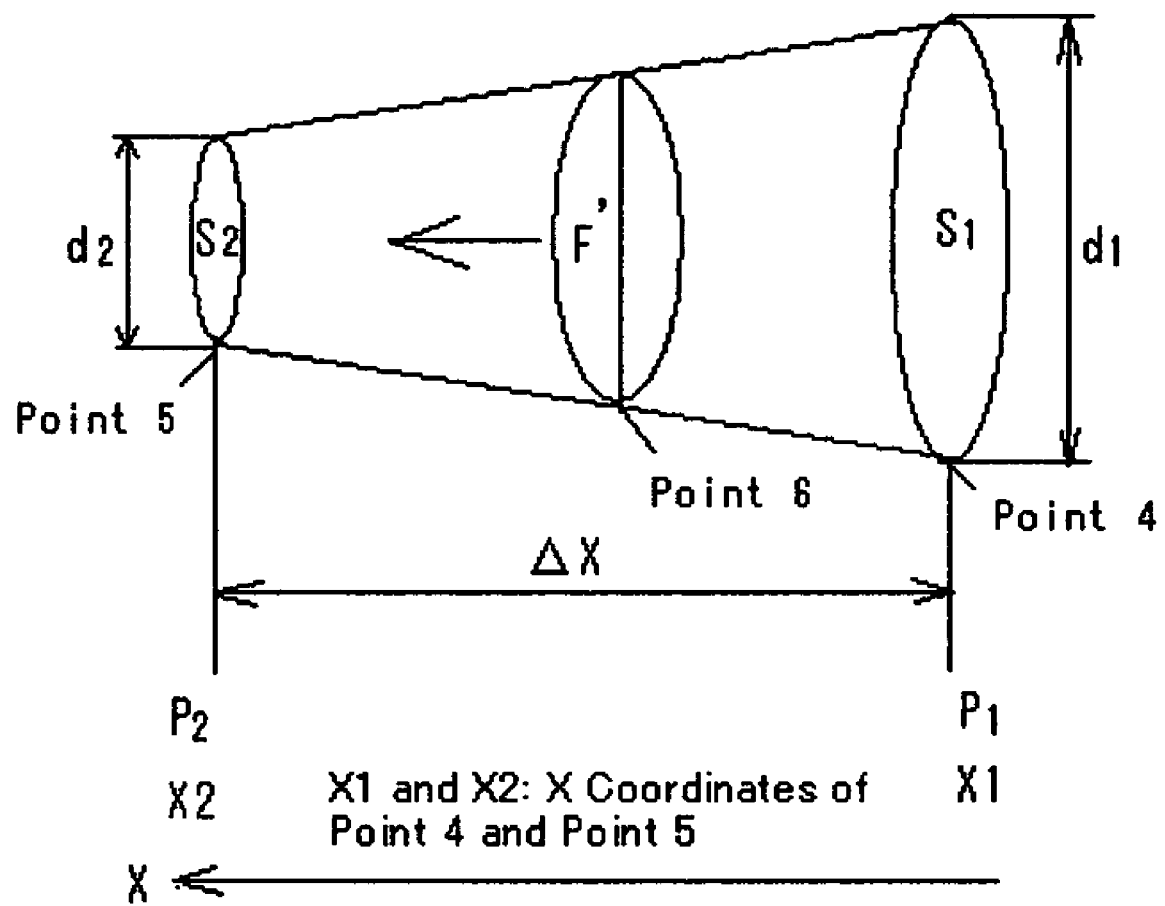
FIG. 14 is an illustration with reference to a principle of measuring a flow rate in a pipe of which cross-sectional area is varying lengthwise.

FIG. 14 shows the principle of calculating a time derivative of flow rate in a pipe of which cross-sectional area varied along the pipe. In the figure, if point 4 and 5 are points apart for a distance X lengthwise in a pipe, and point 6 is the middle point of point 4 and point 5, the inner diameters and cross-section areas at point 4 and point 5 are d1, S1, d2 and S2 respectively, time derivative of flow rate F' can be calculated from Equation 5.

$$F' = -\overline{S} \cdot \frac{\Delta P}{\Delta X} - \frac{F^2}{\rho} \cdot \frac{\overline{S} \cdot Cs}{\Delta X} \quad \text{where} \qquad \text{[Equation 5]}$$

$$\overline{S} = \frac{\Delta X}{\int_{X_1}^{X_2} \frac{dX}{S(X)}} \quad Cs = \frac{1}{S_2^2} - \frac{1}{S_1^2}$$

where P1 and P2 are the pressures at point 4 and 5 respectively, the pressure difference, $\Delta P$ is (P1–P2), $\rho$ is air density, and $\lambda$ is a friction factor of the pipe.

As understood from Equation 5, not only a value of pressure difference ΔP but also a value of air density is necessary to calculate time derivative of flow rate F'. Therefore, preferably the two points for measurement of pressure difference ΔP are positioned in a section of which cross-sectional area S is a constant, and if it is impossible, air density must be calculated from a measured air temperature Ta and P1 or P2 before the calculation of F' by Equation 5

Air flow rate F is carried out using Equation 6. It means that flow rate F can be calculated by the addition of an initial value of integral F0 that means a flow rate at time ts when integration is started and time integration of F'. Then, if time ts when flow rate F is a zero can be detected in some means and integration is started at the moment, integration of F' itself is equal to flow rate F.

[Equation 6]

$$F = \int_{ts}^{te} F' dt + F_0 \quad \begin{array}{l} \text{where} \\ ts: \text{ Integration Starting Time} \\ te: \text{ Integration Ending Time} \end{array}$$ [Equation 6]

Figure 15:
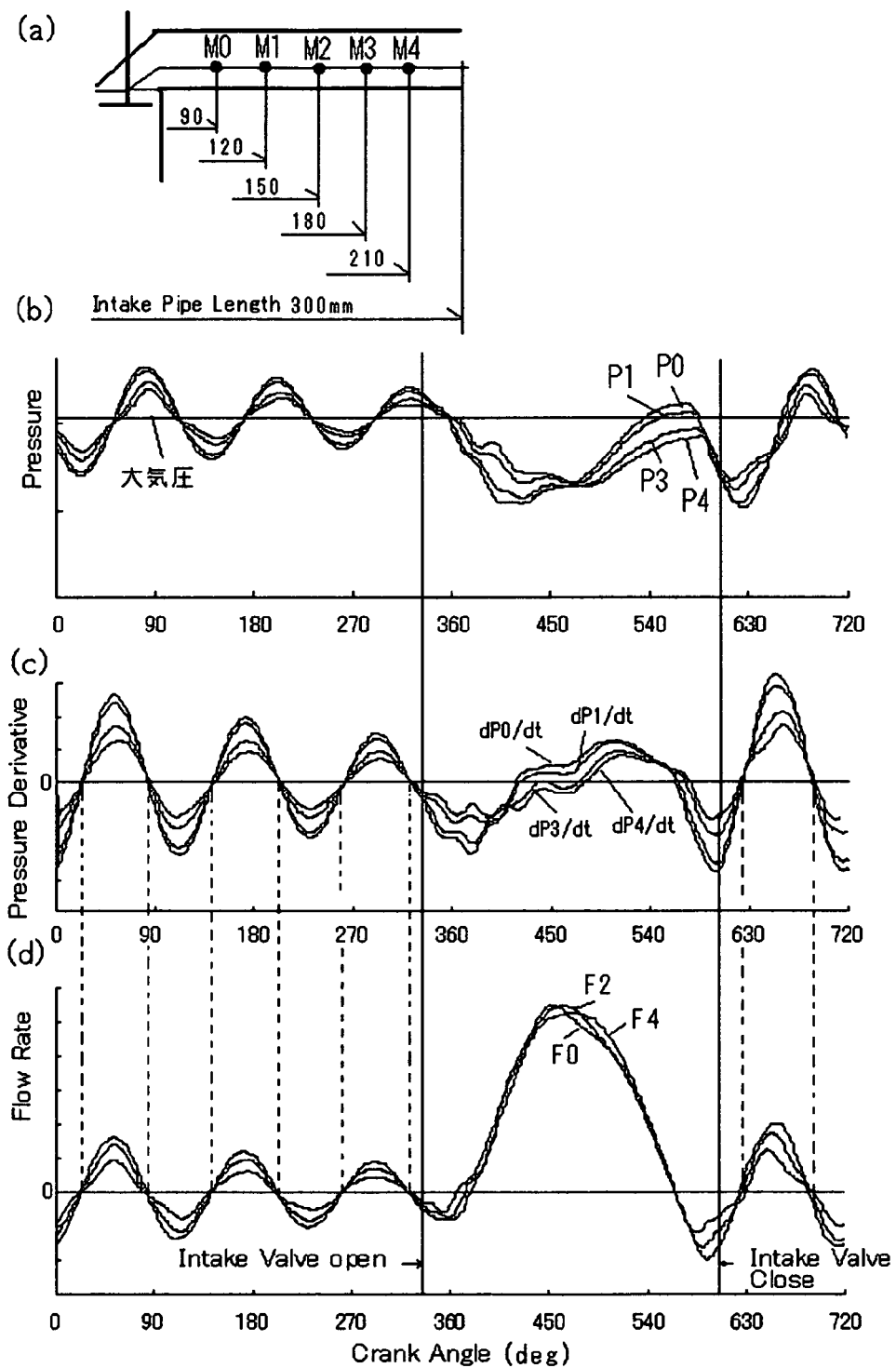
FIG. 15 is a graph for a example of varying of an intake pressure, a flow rate, and time derivative of a pressure.

The principles or equations that the present invention employs to calculate flow rate F and time derivative of flow rate F' were explained through paragraph [0011] to [0017]. Further essential feature of the present invention is employing a method for detecting a moment when flow rate F is a zero using pressure data in an intake pipe. FIG. 15 shows the principle of the detecting. In FIG. 15(a), M0, M1, M2, M3, and M4 are five points in an intake pipe, and in FIG. 15(b), P0, P1, P3, and P4 are the pressures at M0, M1, M3, and M4 respectively. As understood from the figure, all of the pressures in the intake pipe P0, P1, P3, and P4 fluctuate in very complicated manners during an intake valve is opened for air intake, subsequently the pressures alters their forms of fluctuations into the free vibration which consists of harmonic fractions in some orders while the intake valve is being closed. The first order harmonic fraction of the free vibration is termed a fundamental vibration. According to experimental or theoretical analysis, frequency of the fundamental vibration fb can be estimated using Equation 7, and its value does not depend on both a position in a pipe and an engine running speed.

[Equation 7]

$$fb = \frac{a}{4L}$$ [Equation 7]

where a is an acoustic velocity and L is a length of the pipe.

During an air column in an intake pipe is oscillating in the free vibration mode, the fundamental vibration fraction is principal at a random point in the pipe such that, for example in the open end side of the pipe, it appears in significantly bigger amplitude compared with the higher order harmonic fractions, the second order harmonic fraction with the frequency of three times as high as fb superposes in little amplitude on it, and the harmonic fractions of the third or higher orders are as small as negligible. Accordingly, if pressure signals are processed by a low pass filter to remove the range of frequencies down to approximate two times as high as the frequency of the fundamental vibration, the resultant fundamental vibration with a sinusoidal wave form is obtained. FIG. 15(c) shows an example of curves for time derivative of a pressure base on a pressure pulsation of which frequencies range down to approximate two times as high as the frequency of the fundamental vibration is removed, and FIG. 15(d) shows flow rates F0, F2, and F4 at point M1,M2, and M4 respectively. As understood from FIG. 15(b), FIG. 15(c), and FIG. 15(d), flow rates F0, F2, and F4 reach a zero simultaneously at a moment when said time derivatives of a pressures reach a zero while a intake valve is being closed. This fact means that a moment when a time derivative of a pressure at a random point in an intake pipe is in accord with a moments when a flow rate reach a zero while an intake valve is being closed, thus the moment when a flow rate is a zero can be detected by measuring or observing a time derivative of a pressure while an intake valve is being closed. In the following, a time derivative of a pressure base on a pressure pulsation after processing for removing its high frequency range will be expressed a pressure derivative.

It should be noted that the moment when said pressure derivative is a zero means the moment when it is determined that a varying ratio of a pressure after processing for removing its high frequency range is a zero. For example, for an analog differentiator, it means the moment when an output signal shifts from the plus to the minus or to the reverse, and for another type of differentiator like a digital processor, it means the moment when a pressure varying shifted from increasing to decreasing or to the reverse based on a means for calculating varying in time series of sampled values of pressure.

Based on the principles described in paragraphs from [0011] to [0020], the present invention calculates flow rate F by integration of time differential of flow rate F' from a starting time ts to an ending time te which are determined by the following procedures. A pressure at a random point in a pipe is measured and starting time ts is determined from the moment when a pressure derivative is a zero during a period an intake valve is being closed, and ending time te is determined from the moment when said pressure derivative is a zero again during the same period the intake valve is being closed, and said te is set to the ts for the next integration. It is needless to say that either of the two points for measuring the differential pressure can be said random point in a pipe as well.

Subsequently, amount of mass of air M is calculated from integration of flow rate F. However, today's pressure sensor products still have a problem attendant to zero level drifting caused by thermal strain of diaphragms or thermal characteristics of pressure sensing elements. When pressure sensor is installed on engine intake pipes, it may be used under so wide range of temperatures such as from -30 degree C. to +80 degree C., therefore, it is difficult to eliminate said zero level drifting completely even if a zero level compensator is applied to the sensor. Accordingly, it is possible that errors in F and M that is an integrated value of F, continue to grow with the integration time if no corrections are performed on their values.

Figure 16:
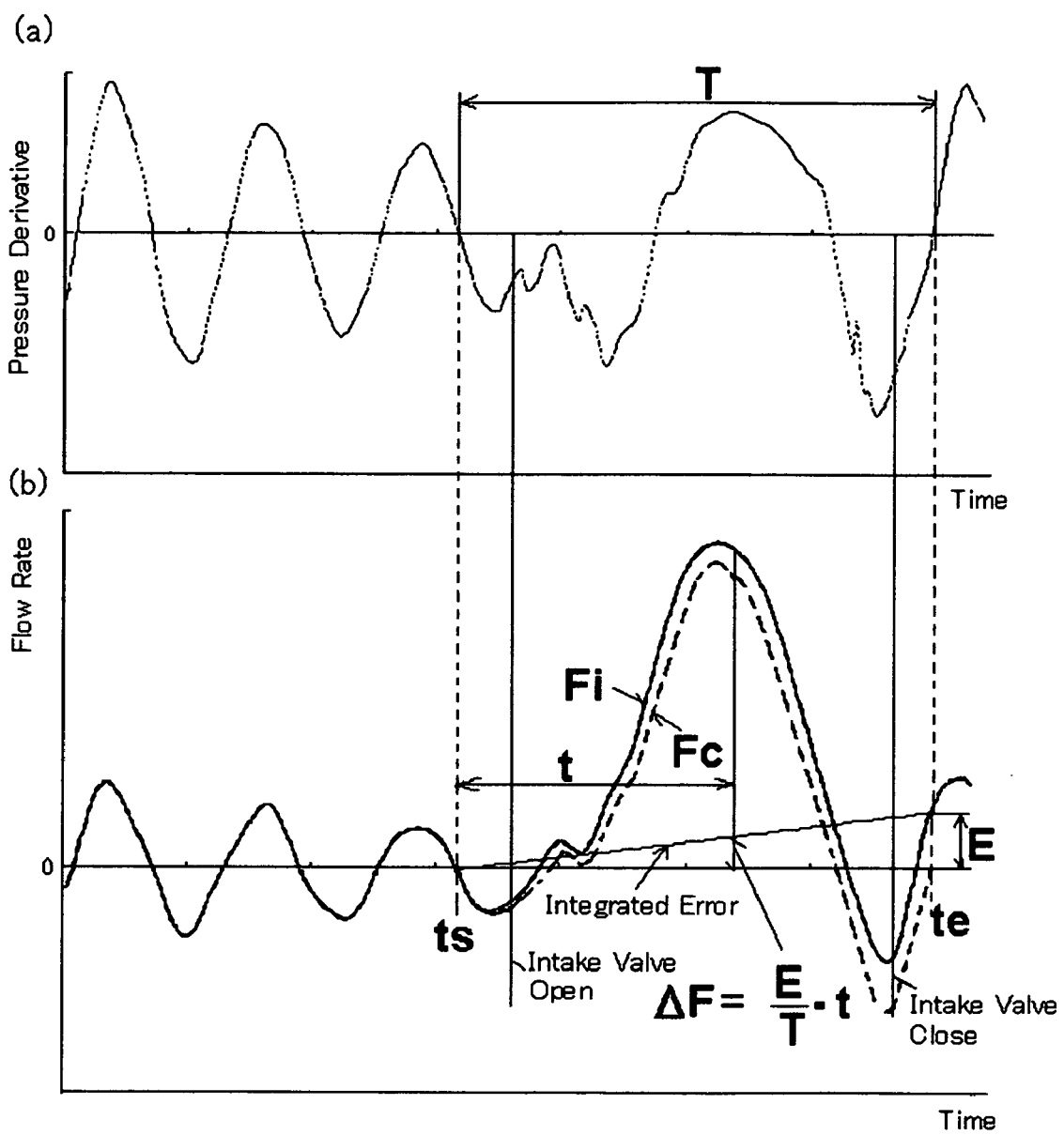
FIG. 16 is an illustration with reference to a principle of correcting an error on a flow rate.
Figure 17:
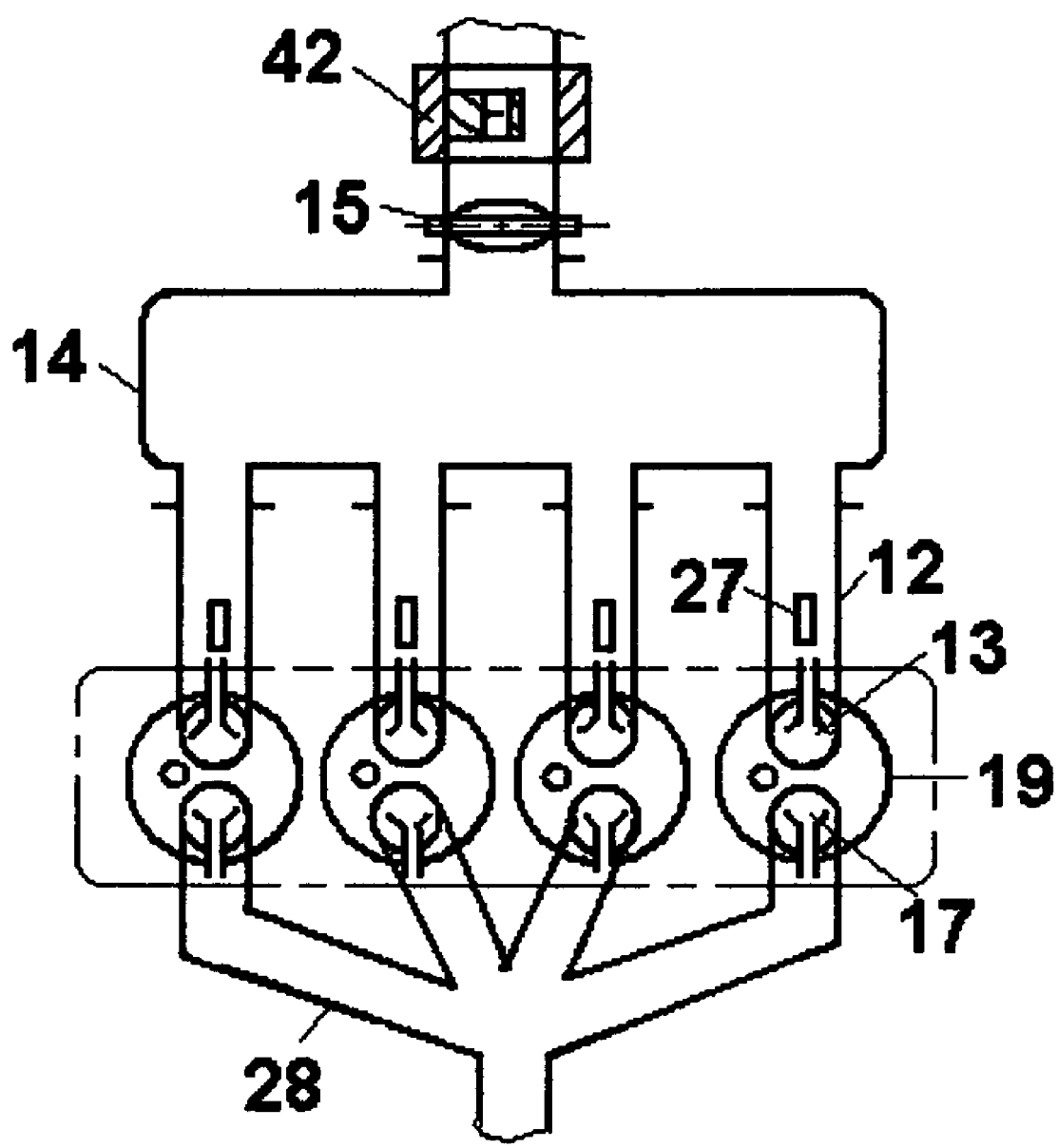
FIG. 17 is a fragmentary schematic illustration of a multi-cylinder engine employing a hot-wire flow meter.

Then, a correction of a value of M which is an integration value for integration period from starting time ts to ending time te, is performed at ending time te. FIG. 16 explains the means for the correction. FIG. 16(a) illustrates a graph of a pressure derivative at a position for pressure measurement. In FIG. 16(b), an Fi means a flow rate that is an integration value of time derivative of flow rate F' before a correction is performed, an Fc means a flow rate after a correction is performed, a ts means a time when integration is started, te means a time when integration is ended, a T means time length of an integration period (time length from ts to te),a t means an elapsed time since ts, and an E means a value of Fi at te when integration is ended. Here, a value of E must be a zero if measuring pressures is performed with no error, and if with a certain amount of error, a value of E results in integration of measurement errors during said integration period T. As long as a pressure sensor capable of measuring pressure fluctuation with high response is employed, a main cause of measurement error is said zero level drifting that is attributed to a temperature varying of a pressure sensor or an atmosphere around it, therefore it can be considered that an amount of said zero level drifting is a constant through such a short span as one engine cycle. Thus, the error caused by said zero level drifting can be corrected by the following procedures performed at least once in one engine cycle. A ΔF that is an error of F at random time t is expressed in terms of Equation 8.

$$\Delta F = \frac{E}{T} \cdot t \qquad \text{[Equation 8]}$$

Also, ΔM that is an error of M for the integration period T is expressed in term of Equation 9.

$$\Delta M = \frac{1}{2} \cdot E \cdot T \qquad \text{[Equation 9]}$$

Finally, a corrected value of M for the integration period T is calculated from Equation 10 as well.

$$M = \int_n^T F dt - \frac{1}{2} \cdot E \cdot T \qquad \text{[Equation 10]}$$

Even if an amount of said zero level drifting is not a constant, a value of M can be corrected using F at the end of integration and length of integration period T, when said amount of zero level drifting can be given by known functions.

The present invention embodies a means of measuring air flow rates for each cylinder of a multi-cylinder engine employing pressure sensors with low cost and high resistance to deterioration in measurement accuracy by stains based on the principles described in paragraphs from [0011] to [0024].

Figures from FIG. 1 to FIG. 12 show the embodiments of the present invention. In these figures, reference number 1 refers to a differential pressure sensor, 2 refers to a pressure sensor, 3 refers to an amplifier, 4 refers to a low pass filter, 5 refers to a differentiator, 6 refers to a integrator, 7 refers to an A/D converter, 8 refers to a crank angle signal processor, 9 refers to an integration module, 10 refers to a double integration module, 11 refers to an output module, 12 refers to an intake pipe, 13 refers to an intake valve, 14 refers to an air collector, 15 refers to a throttle valve, 16 refers to a cam, 17 refers to an exhaust valve, 18 refers to a cylinder head, 19 refers to an cylinder, 20 refers to a piston, 21 refers to a connecting rod, 22 refers to a crank shaft, 23 refers to an intake port, 24 refers to a crank angle sensor, 25 refers to an sensor for detecting engine top dead center, 26 refers to an cylinder of a multi-cylinder engine, 27 refers to a fuel injector, 28 refers to an exhaust manifold, 29 and 31 refer to measurement holes, 30 and 32 refer to cavities, 33 refers to a diaphragm, 34 and 35 refer to electrodes, 36 and 37 refer to pressure sensors, 38 refers to a differential pressure processor, 39 refers to an air cleaner box, 40 refers to an air filter, and 41 refers to a temperature sensor.

Further, in the following, a Δt is a time interval for data sampling, a ΔC is an interval of crank angle pulses in degree, an n is a count of crank pulses, a CA is a crank angle from the top dead center, a TIO is a crank angle for intake valve opening, a TIC is a crank angle for intake valve close, a Vf is a digitized value of the differential pressure processed by A/D converter 7, a Vp is a digitized value of a pressure (suffix next to p means a number of the pressure sensors), a Vd is a digitized value of a differential pressure(suffix N or N−1 means a number of samples), a Ta is ambient temperature, a K1, K2, Kr, and Ks are proportional constants, an S is an integrated value of a product of Vf by Δt, an SS is an integrated value of a product of S by Δt, a t is an integration time that means a time length from a moment when the last correction for a integration values were performed, a f(S,T) is a function to correct the value of SS of S and T, a ΔSS is a corrector calculated from f(S,T), a T is a time span of integration, an RST is a flag variable for correcting, an R0 is a density of air, an Ne is an engine speed, an Nc is an engine speed where pressure sensors applied are changed.

Figure 1:
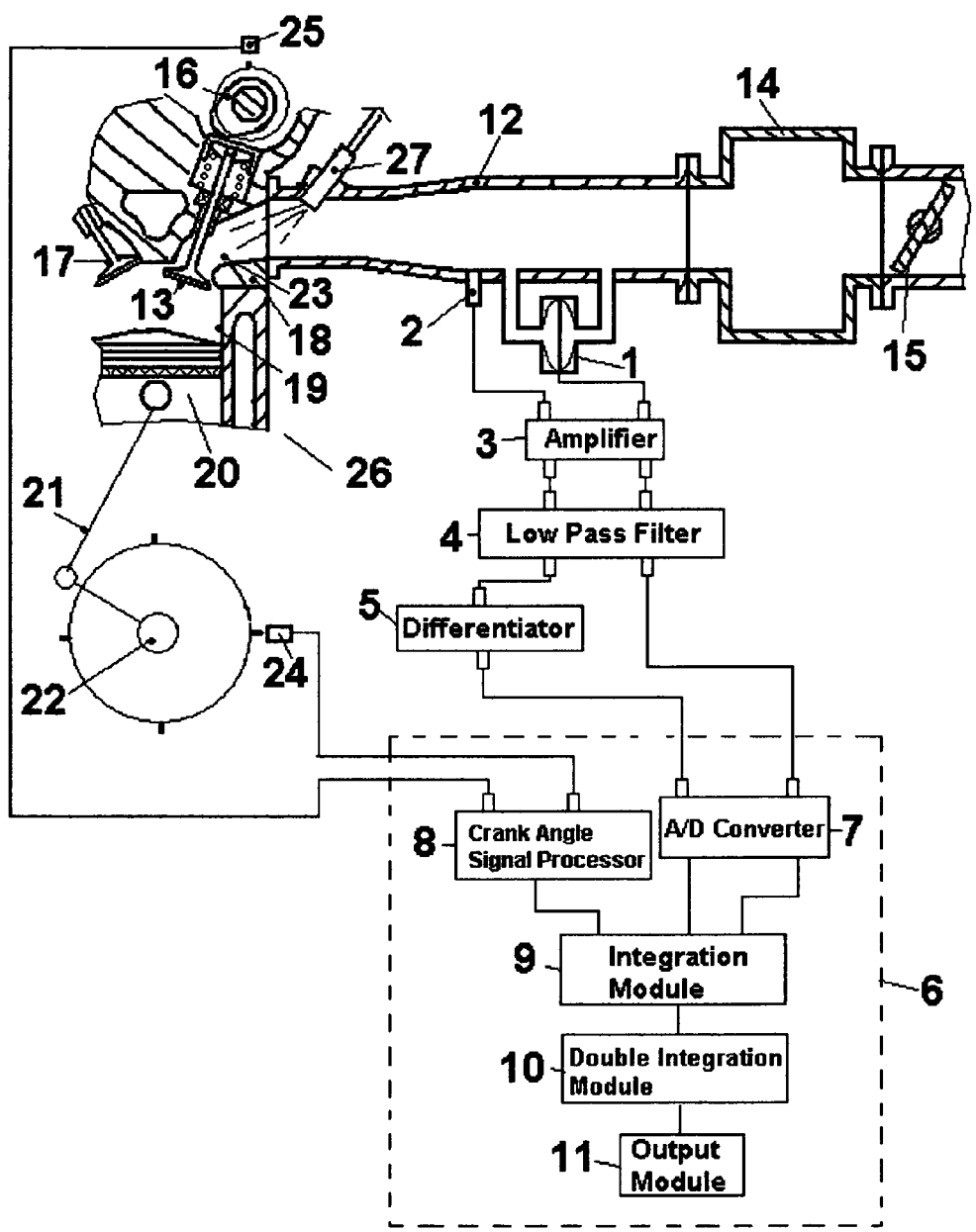
FIG. 1 is a schematic view of an intake air flow meter for a multi-cylinder engine embodying the present invention, which is corresponding to a sectional view taken along the plane A–A' of FIG. 2.
Figure 2:
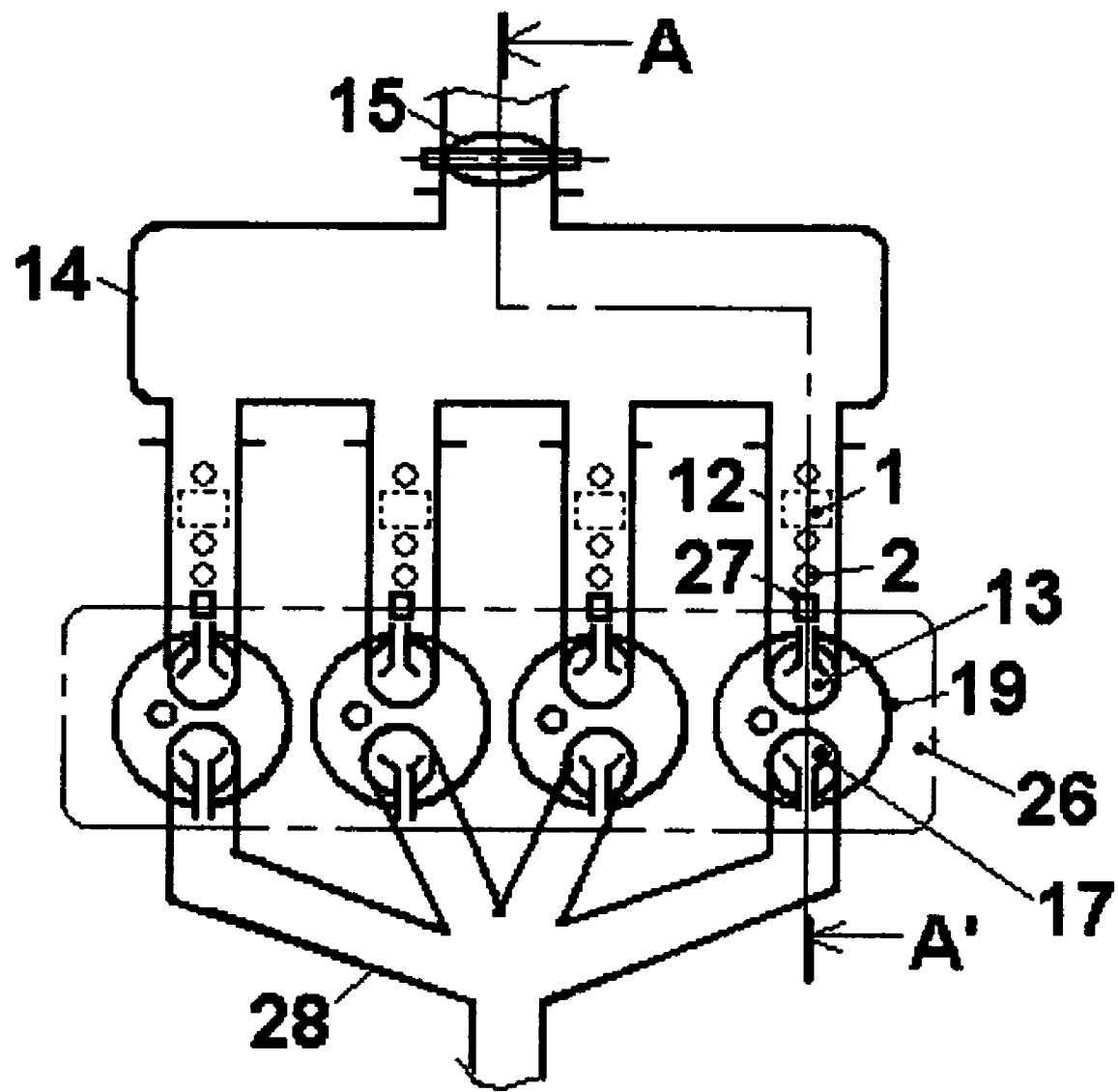
FIG. 2 is a fragmentary schematic illustration of a multi-cylinder engine.

FIG. 1 illustrates particularly a construction of a cylinder of a multi-cylinder engine corresponding to a sectional view taken along the plane A–A' of FIG. 2, which essentially comprise essences of a first embodiment of the present invention that is basically common for every cylinder of said multi-cylinder engine. In FIG. 1, a cylinder 19 is in communication with an intake system comprising an intake port 23, an intake pipe 12, an air collector 14, a throttle valve 15, and an air cleaner box not shown, and a communication between cylinder 19 and the intake system is intermittently interrupted by an intake valve 13 that is constrained to reciprocative motion by a cam 16. A fuel injector 27 injects an amount fuel determined from an air flow mass measured for each cylinder and a target air-fuel ratio. Intake pipe 12 has a section with a constant cross-sectional area where a differential pressure sensor 1 and a pressure sensor 2 are installed. Preferably sensors with sufficiently high natural frequency and response for measurement of fluctuating pressures, such as a semi-conductor strain gauge type, a piezo type, or a capacitance type sensor, are applied to differential pressure sensor 1 or pressure sensor 2.

Then, procedures for calculating a flow rate from pressure signals of differential pressure sensor 1 and pressure sensor 2 in this embodiment is explained as follows. It should be noted that detailed explanations on processors such as inner-constructions or circuit configurations are abbreviated because a principal object of the present invention is related to the procedures for processing the pressure signals rather than detailed configurations of processors.

First, output signals of differential pressure sensor 1 and pressure sensor 2 are amplified with amplifier 3. Then, output signal of amplifier 3 are sent to low pass filter 4 in order to remove fractions in a high frequency range originated from turbulence or vortices exiting only in a small part of the a passage of the pipe, and rather working as noises in measuring a flow rate. Preferably the fractions in a high frequency range down to approximate five times as high as fundamental frequency fb is removed.

Both of a digital type or an analog type are applicable to integrator 6, but in the following description refers to a digital type. Basically, integrator 6 consists of A/D converter 7, crank angle signal processor 8, integration module 9, double integration module 10, and output module 11.

A/D converter 7 converts analog output signals of differential pressure sensor 1 and differentiator 5 from low pass filter 4 into digital data. In the following, a digitized output signal of differential pressure sensor, pressure sensor, and an output signal of differentiator are expressed Vf, Vp, and Vd respectively. Crank angle signal processor 8 counts crank angle pulses n from an engine compression top dead center, according to a top dead center pulse from cam angle sensor 25 and crank angle pulse from crank angle sensor 24.

Integration module 9 has a pre-loaded program to calculate single integration of a digit value of differential pressure from A/D converter 7, double integration module 10 has a program to calculate integration of said single integration, and output module 12 has a program to convert the values of said single integration and double integration to a flow rate and an amount of mass of air respectively.

On the other hand, an output signal of pressure sensor 2 is amplified with amplifier 3 and transmitted to differentiator 5 after processing of removing a range of frequencies down to approximate two times of said fundamental vibration fb by low pass filter 4.

Figure 4:
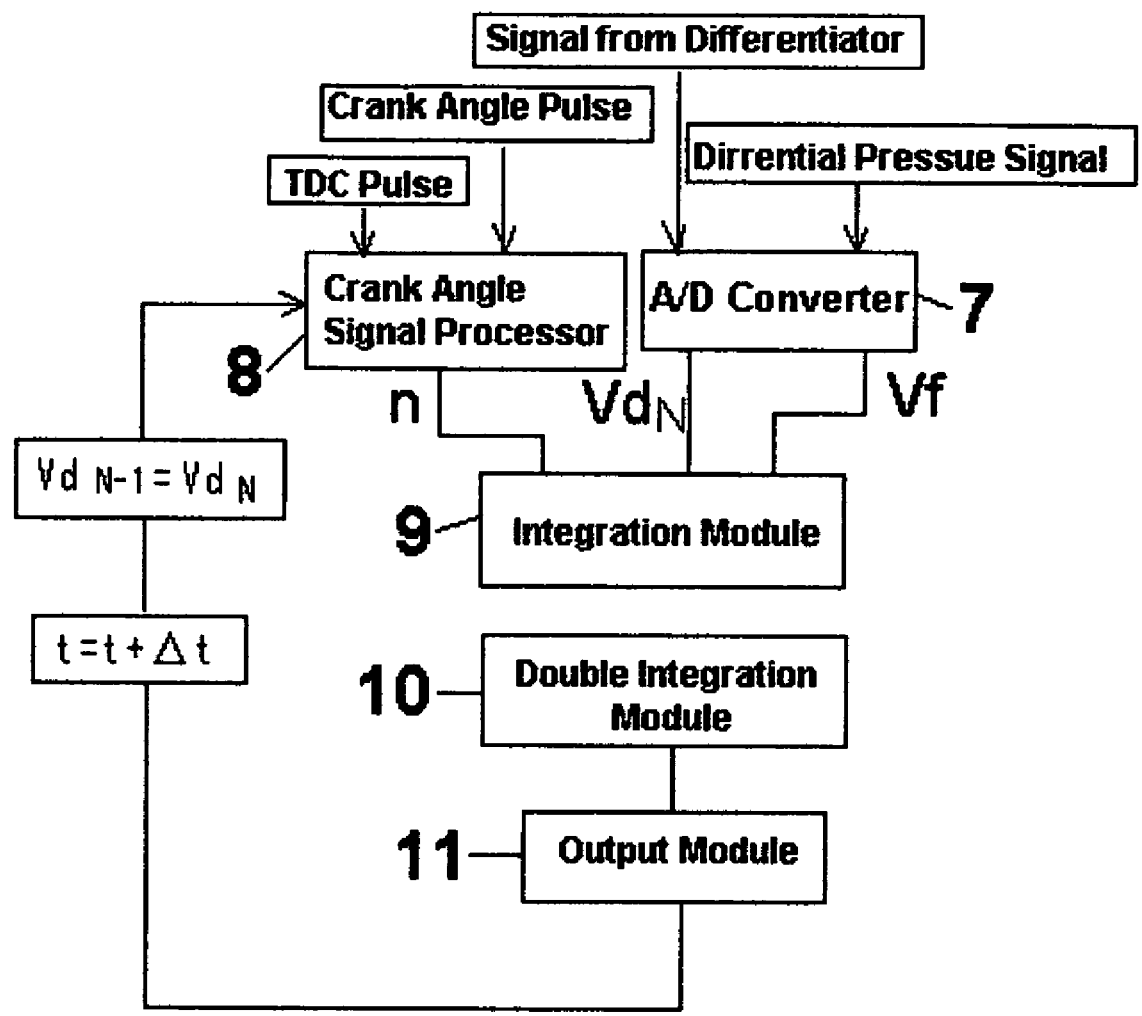
FIG. 4 is a schematic flow sheet of data processing in an integrator.
Figure 5:
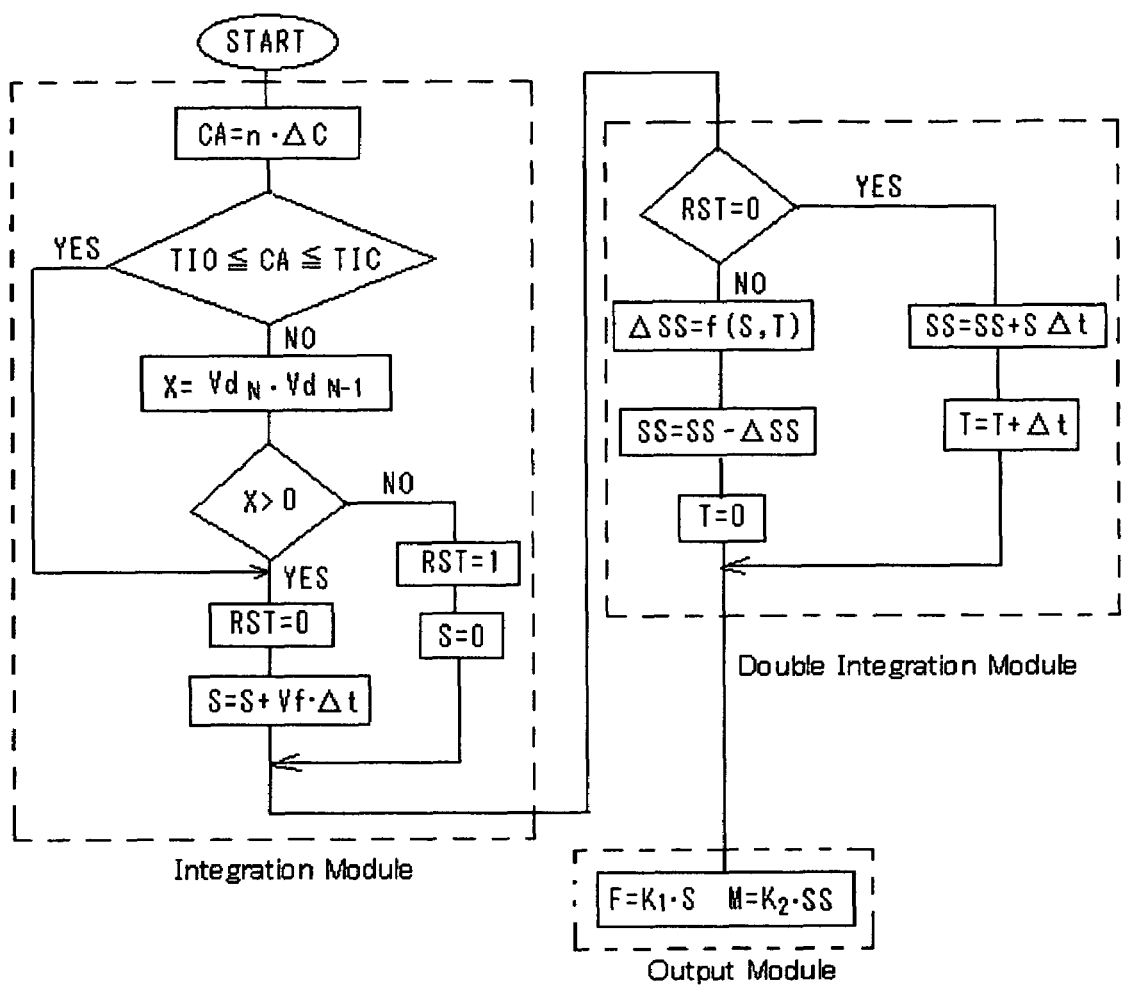
FIG. 5 is a flow sheet of an integration module, a double integration module, and an output module in an integrator.
Figure 6:
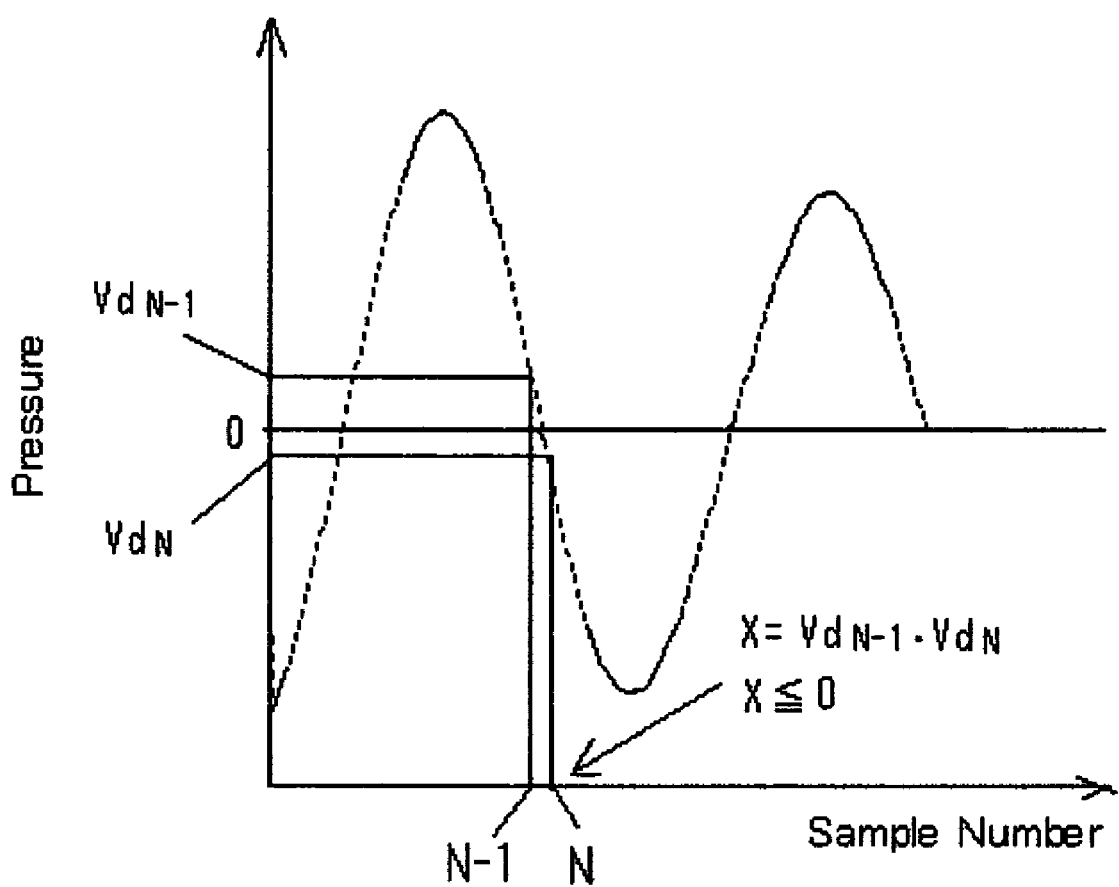
FIG. 6 is an illustration with reference to a principle of determining whether a time derivative of a pressure is a zero.

FIGS. 4, 5, and 6 shows the procedures for data processing in integrator 6. Particularly, FIG. 4 shows a basic flow diagram for the processing. During an engine is running, a looped routine is repeated so that an output signal of A/D converter 7 and an output signal of crank angle signal processor 8 are sampled in every Δt of time, and the sampled data are processed in integration module 9 and double integration module 10 of which results are sent to output module 11.

FIG. 5 shows more detail of a flow diagram for data processing in integration module 9, double integration module 10, and output module 11. Integration module 9 executes either integration or correction calculation selectively according to the results of steps of conditional branch that determines whether current crank angle CA calculated by a product of interval of crank angle pulses in degree ΔC by count of crank pulses n is between an intake valve opening timing and its closing timing, and pressure derivative Vd is detected being a zero. Said integration means that a product of Vf by Δt is added to an integration value S, and a variable RST which is defined to determine which calculation must be executed is set to 0, and said correction means that a value of integration is reset to a zero and RST is set to 1.

FIG. 6 illustrates a method to determine whether said output signal is a zero. If N and N−1 are numbers of the current or the last sample respectively, VdN and VdN−1 means the values of said Vd's for N and N−1 respectively, and X is the product of VdN by VdN−1, the current Vd is determined a zero when X is equal to a zero or less than zero.

In integration module 9, during the crank angle CA is being between intake valve open timing TIO and intake valve close timing TIC said integration calculation is performed and the subsequent procedure is jumped to double integration module 10. On the other hand, during the crank angle CA is not being between TIO and TIC, said correcting calculation is performed when Vd is equal to a zero, while said integration calculation is executed when Vd is not equal to a zero, before the procedure proceeds to double integration module 10.

In double integration module 10, either double integration calculation or correction calculation is executed selectively according to the results of steps of conditional branch that determines whether a value of RST is a zero. Said double integrating calculation means that a product of S by Δt is added to the current double integration value SS, and Δt is added to the current integration time T as well. On the other hand, said correction calculation means a correction of a value of SS by subtracting ΔSS that is an estimated error on SS calculated from function f (S,T) from SS, and resetting said integration time T to a zero. In the routine for a double integration, when RST is equal to a zero, said double integration is performed. On the other hand, when RST is equal to 1, the procedure proceeds to output module 11 after said correction calculation is executed.

Output module 11 outputs values of a flow rate and an amount of air in proper units that are products of S multiplied by K1, and SS multiplied by K2 respectively, where K1 and K are determined from a sensitivity of a pressure sensor or a gain of an amplifier. It must be noted that an analog type integrator can be substituted for said integrator 6 which is a digital type.

FIG. 2 illustrates a partly sectional fragmentary schematic illustration of the first embodiment applied to a multi-cylinder, multi-port fuel injection engine. It should be noted that FIG. 1 corresponds to a sectional view taken along the plane A–A' of FIG. 2. The figure shows a four cylinder engine provided with an independent intake pipe 12 for each cylinder, a conjunct exhaust manifold 28, an air collector 14 for distributing air to each said intake pipe equivalently, and a throttle valve 15 for controlling an amount of intake air at the upstream section of said air collector. Fuel injector 27, differential pressure sensor 1, and pressure sensor 2 are installed on each intake pipe.

Figure 3:
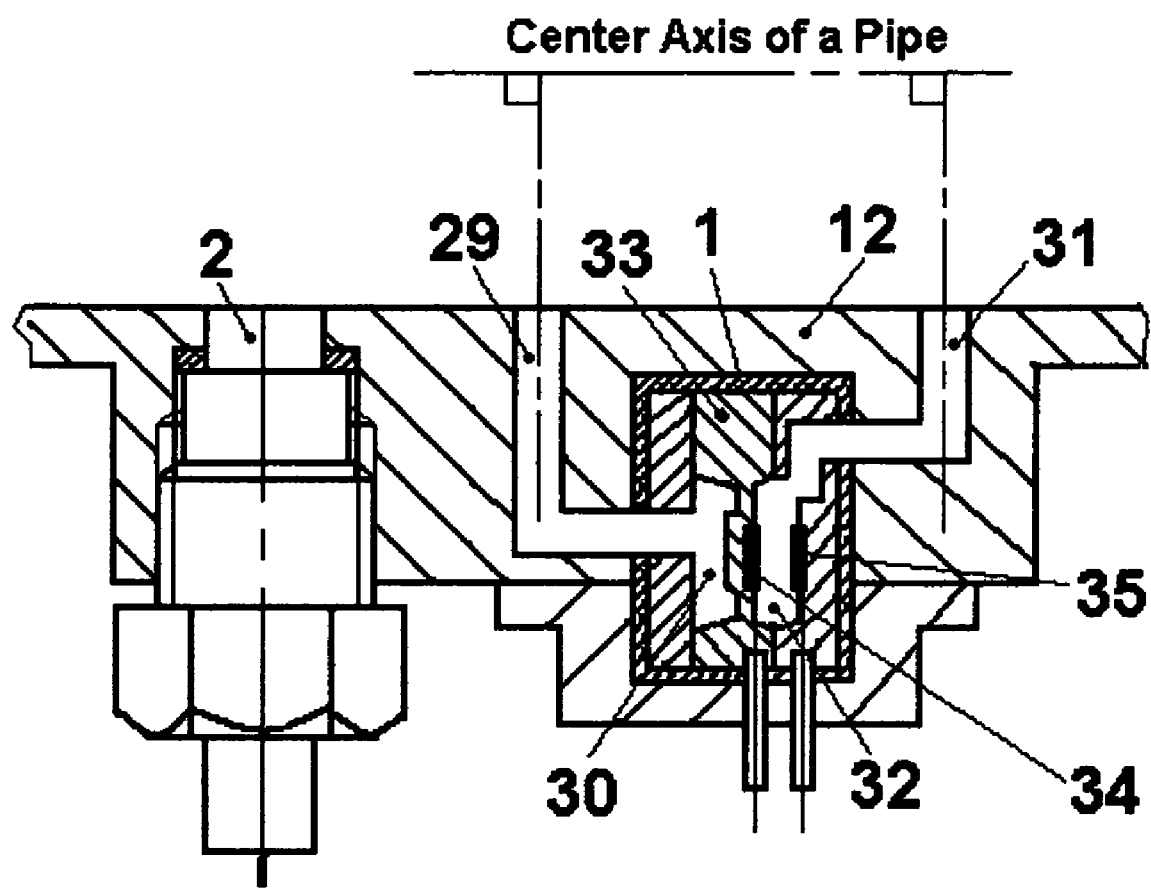
FIG. 3 is a fragmentary sectional view of an intake pipe.

FIG. 3 shows a fragmentary sectional view of intake pipe 12 where differential pressure sensor 1 or pressure sensor 2 are installed. The differential sensor shown in the figure is a typical capacitance type sensor. It involves cavities 30 and 32 separated with a diaphragm 33, and cavities 30 and 32 are in communication with intake pipe 12 by measurement holes 29 and 31 respectively. Diaphragm 33 is retained so as to be deflected by a pressure difference between the two cavities, and varying in capacitance between two electrodes 34 and 35 attached on diaphragm 33 or the opposite side surface of cavity 32 respectively is measured to detect a differential pressure. All the types of differential pressure sensor as well as the capacitance type shown in the figure employ a common basic structure involving elements such as cavities 30 and 32, measurement holes 29 and 31, and diaphragm 33. Preferably, measurement holes 29 and 32 are short and cavities 30 and 32 are small to minimize response delay or declining of the pressures between the cavities and the inlets of the measurement holes, and further the open ends of measurement holes 29 or 31 are processed in such a way that center axes of the holes are perpendicular to a center axis of the intake pipe direction so that a kinetic pressure of air flow may not be introduced into the holes. It is desirable that pressure sensor 2 for measuring a pressure is flush-mounted so that a diaphragm of the sensor forms a same face with an inner wall of intake pipe 12 and installed in such a way that the diaphragm face is parallel to the center axis of the intake pipe 12 so that it may not detect a kinetic pressure of air flow.

Figure 7:
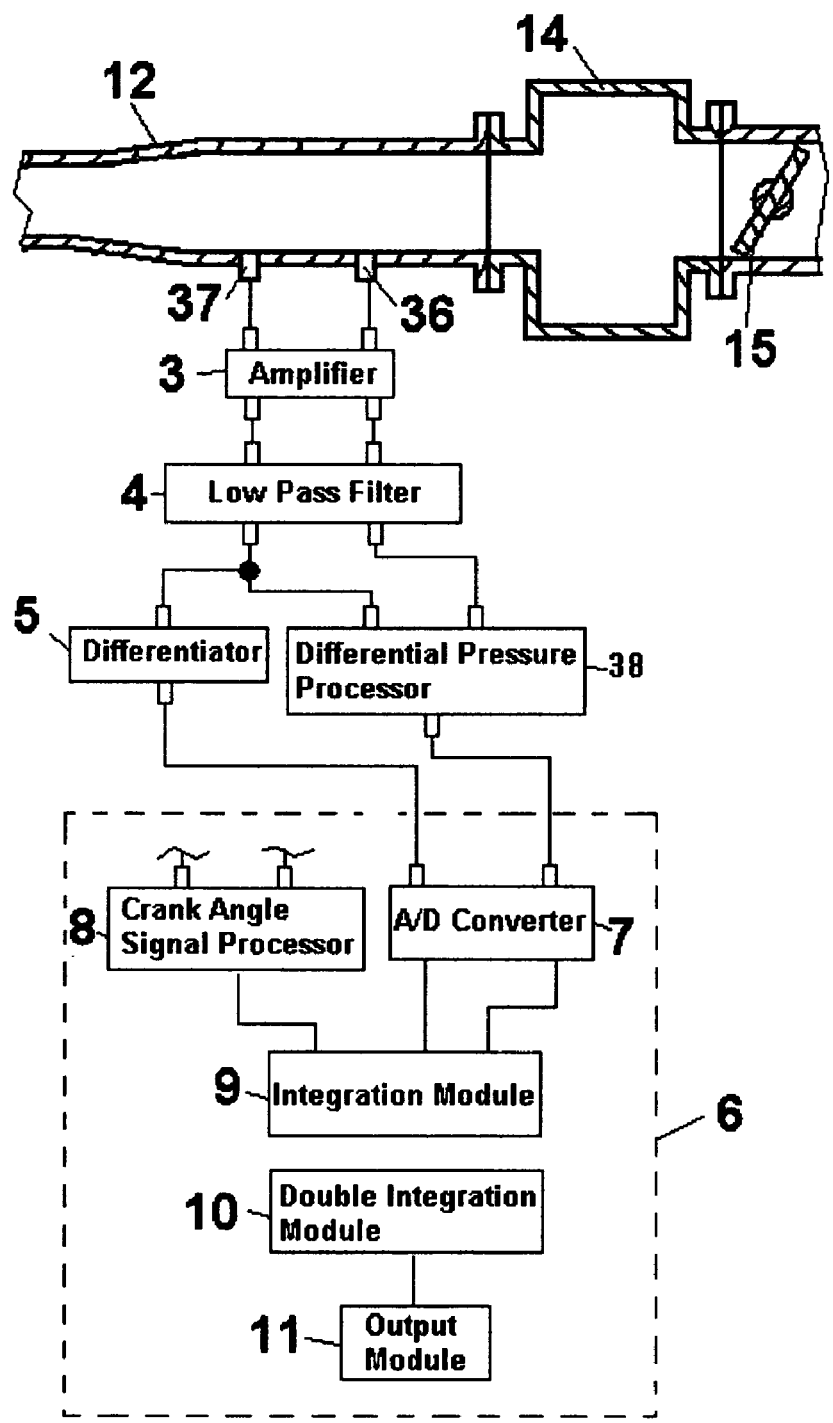
FIG. 7 is a schematic view of a second form of an intake air flow meter embodying the present invention.

FIG. 7 shows a schematic view of a second embodiment of this invention. This embodiment features that two pressure sensors 36 and 37 with equal sensitivity for pressures are employed for measuring a differential pressure unlike the first embodiment that employs a differential pressure sensor, and a differential pressure is calculated from a difference between outputs of said two pressure sensors, further a pressure derivative is calculated by an output of either of said two pressure sensors. It is particularly alternative for the first embodiment in such an application that measurement holes 29 and 31 of differential pressure sensor 1 cannot be shorten sufficiently to meet required response because of restrictions in design of intake pipe 12 or size of sensor 1. In this example, as shown in FIG. 7, an output signal of pressure sensor 36 sent to a differential pressure processor 38 after being processed by amplifier 3 and low pass filter 4 as well as noted in paragraph [0030], and an output signal of pressure sensor 37 is sent to both differentiator 5 and differential pressure processor 38, through amplifier 3 and low pass filter 4.

Figure 8:
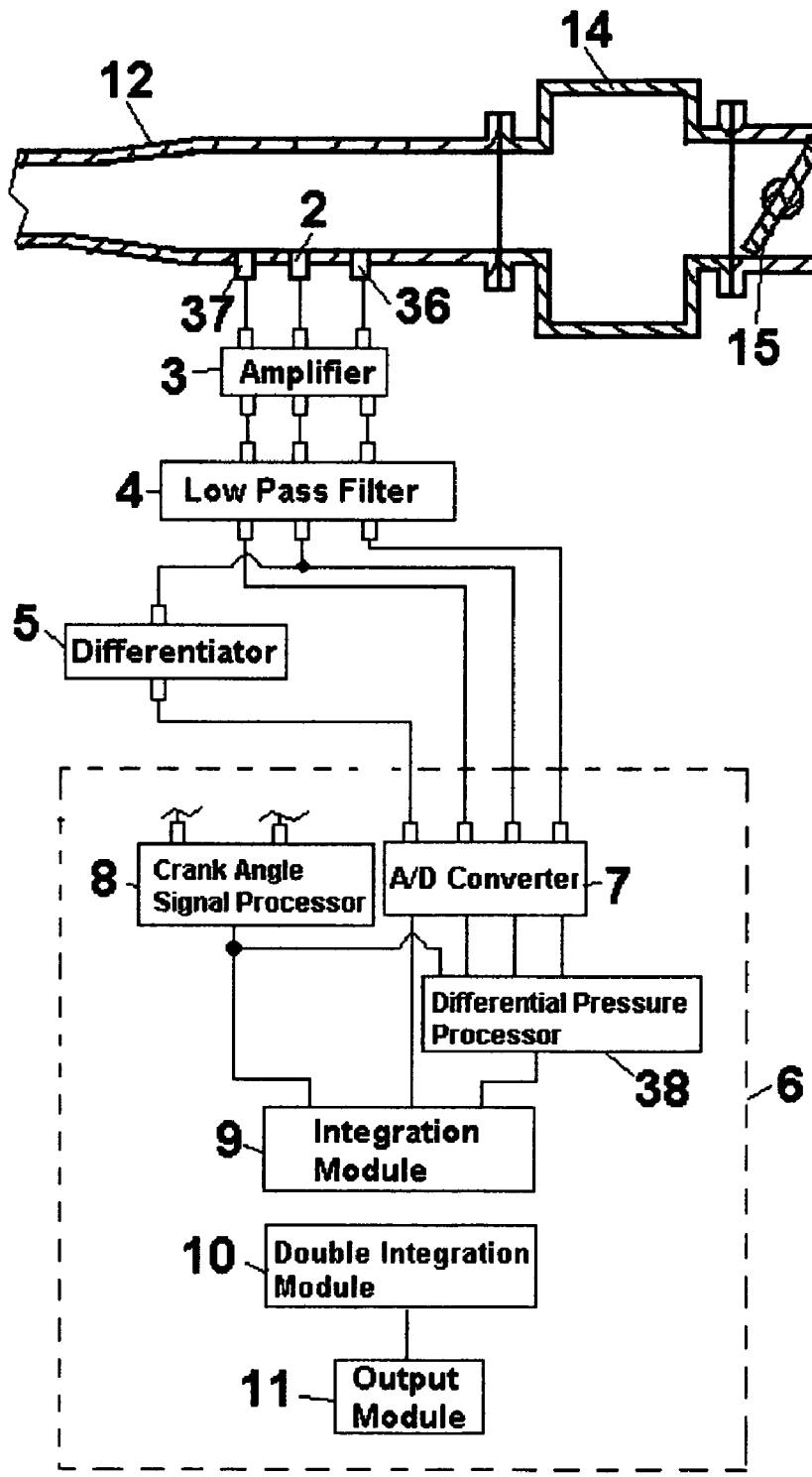
FIG. 8 is a schematic view of a third form of an intake air flow meter embodying the present invention.

FIG. 8 shows a schematic view of a third embodiment of this invention. This embodiment features that three or more pressure sensors with equal sensitivity to pressures are employed for measuring a differential pressure to allow a choice of a combination of two of said pressure sensors based on engine running conditions. A typical choice of the combination of the sensors is such that two sensors in a longer distance spaced apart are used through a low engine speed range where an averaged frequency of intake flow pulsation is low and pressure gradient along the intake pipe is small, while two sensors in a shorter distance spaced apart are used through a high engine speed range. The figure illustrates an example employing three pressure sensors 2, 36, and 37. In this embodiment output signals from said three sensors are transmitted to a differential pressure processor 38 after being processed by amplifier 3 and low pass filter 4 as well as noted in paragraph [0030], and A/D converter 7 that converts analog signals of the pressure sensors 2, 36 and 37 into digital values Vd2, Vd36, and Vd37, respectively. Differential pressure processor 38 execute a calculation of Vf using two different equations selectively depending on an engine speed, such as Vf=Vd36−Vd37 when an engine speed Ne is less than an engine speed for switching Nc which is predetermined, and as Vf=Vd36−Vd2, when Ne is greater than Nc.

Figure 9:
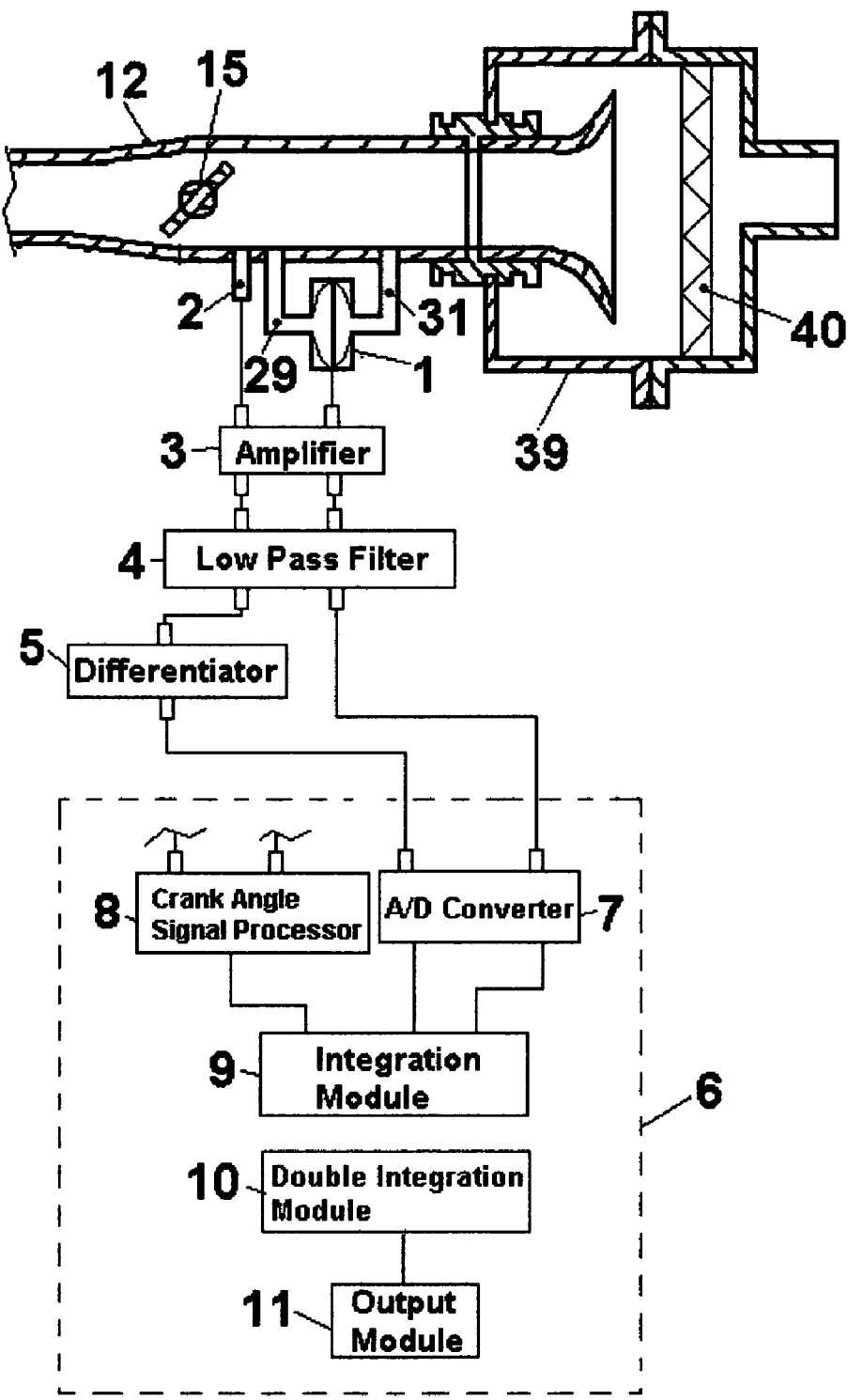
FIG. 9 is a schematic view of a fourth form of an intake air flow meter embodying the present invention.

FIG. 9 shows a schematic view of a fourth embodiment of this invention. This embodiment features that two points in an intake pipe for a differential pressure measuring are both set in either of the upstream side of throttle valve 15 or the downstream side. It is especially suited to an application for an engine employing independent throttles for each intake pipe for such as motorcycles, racing cars, or sports cars.

Figure 10:
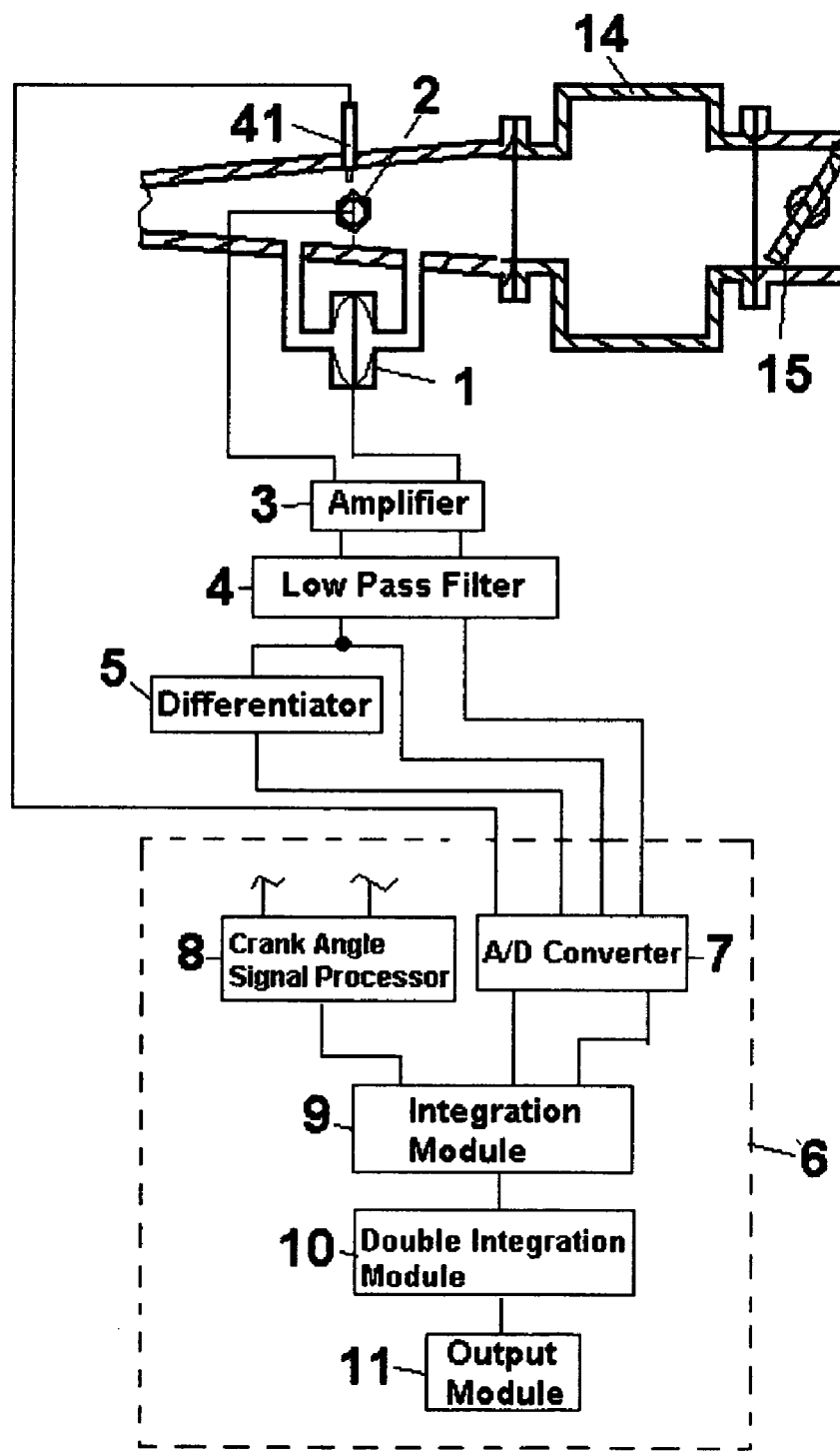
FIG. 10 is a schematic view of a fifth form of an intake air flow meter embodying the present invention.
Figure 11:
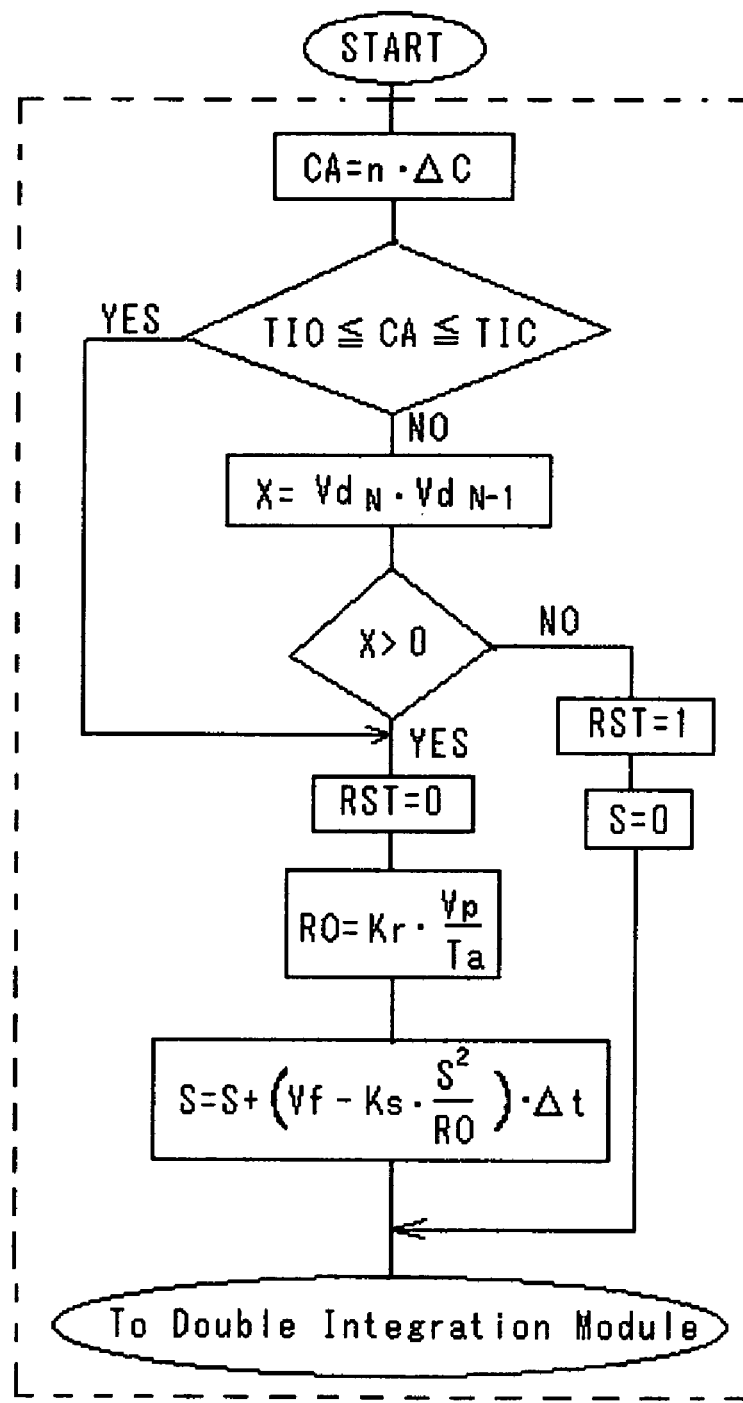
FIG. 11 is a flow sheet of data processing in an integrator for the fifth form of an intake air flow meter embodying the present invention.
Figure 12:
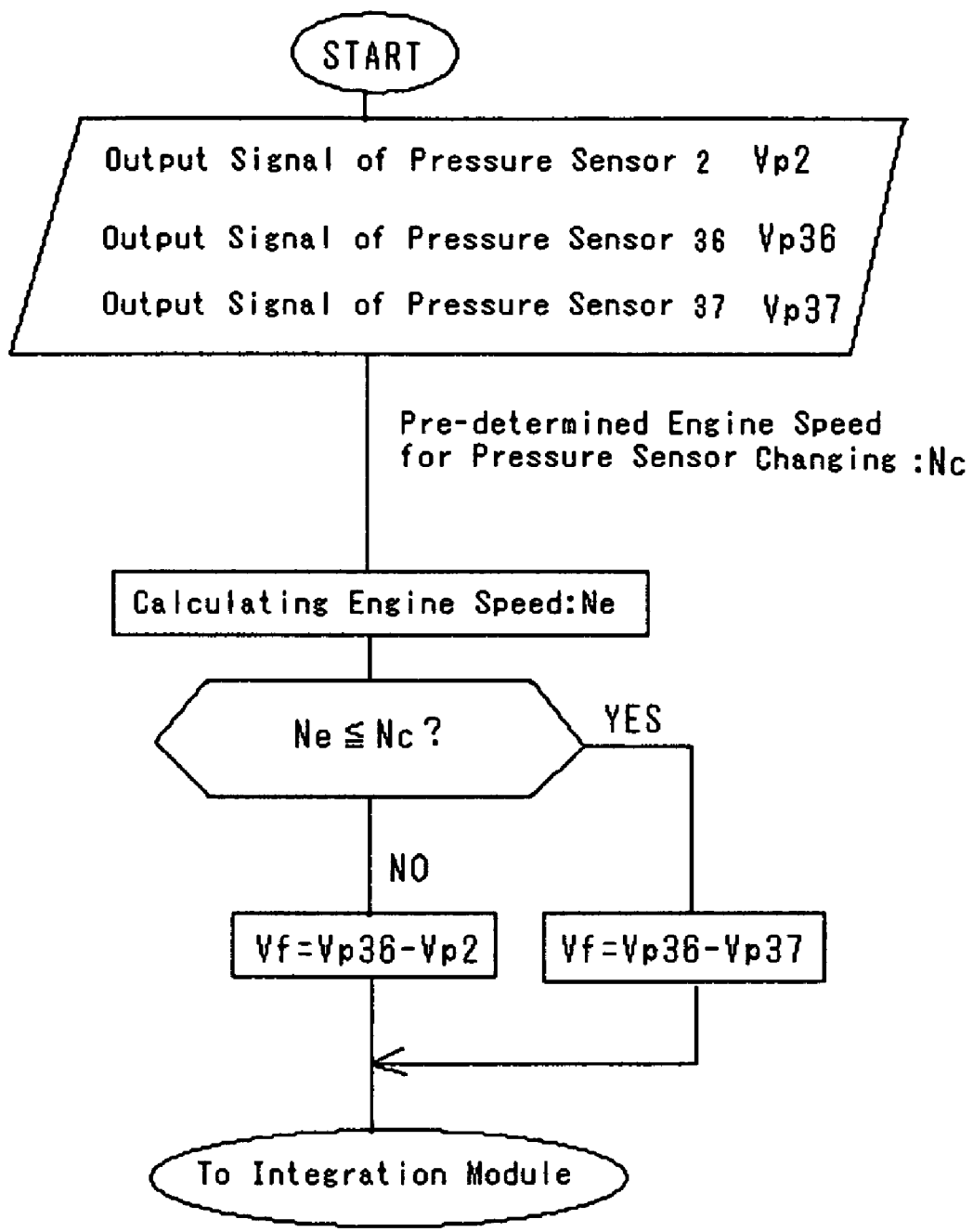
FIG. 12 is a flow sheet of data processing in an differential pressure processor.

FIG. 10 shows a schematic view of a fifth embodiment of this invention. This embodiment features that two points for measuring a differential pressure are located in a section of an intake pipe where the cross-sectional area is varying lengthwise, and it is particularly alternative for the first embodiment for an application for such an engine employing an intake pipe with a form that it continuously expands toward to its open end as its resultant optimized design for increasing a volumetric efficiency by dynamic effects of intake flow, such as inertia effect or pulsation effect. In this embodiment, as shown FIG. 10 air temperature is measured by temperature sensor 41 mounted close to pressure sensor 2, and output signal of the pressure sensor 2 branches off in two routes after being processed by amplifier 3 and low pass filter 4 as well as noted in paragraph [0030], so that one is input to differentiator 5 and another is transmitted to A/D converter 7 of integrator 6. A data processing flow in integration module 9 of integrator 6 in the fifth embodiment is shown in FIG. 11. The feature of this data processing is that air density RO is calculated from Vp and Ta first, and said RO is used for integration calculation subsequently.

As described above, an engine air flow meter in the present invention, employing pressure sensors for measuring an amount of air for each cylinder of multi-cylinder engine, provides an air-fuel ratio control system with high accuracy, low cost, and high resistance to deterioration on performance compared with a hot-wire or Karman vortices type flow meter for engines such as automobile applications. Its applications involves not only an engine air flow meter but also a mass flow meter capable for measuring pulsation flow in such a severe field as dusts or particles are floating.

The invention claimed is:

1. An engine intake air flow meter for measurement of an engine intake air flow rate employing a device to measure a pressure difference between two points and a pressure at one point in an engine intake pipe and to calculate a mass flow rate of intake air based on the pressure values, comprising a device for measuring a pressure difference between two points in an intake pipe spaced apart lengthwise in said intake pipe, a device for measuring a pressure at a point that is either of said two points or a third point in said intake pipe different from said two points, a device for calculating integration of said pressure difference and double integration that means integration of said integration of said pressure difference, a device for detecting a moment when an air flow rate is a zero according to a time derivative of said pressure at a point and correcting both said integration and said double integration at said moment, and a device for calculating a mass flow rate by said integration and an amount of air by said double integration.

2. An engine intake air flow meter as set forth in claim 1, wherein the moment when said air flow rate is a zero is detected at the moment when said time derivative of said pressure at a point reaches a zero during an intake valve is being closed.

* * * * *